Figure 3:
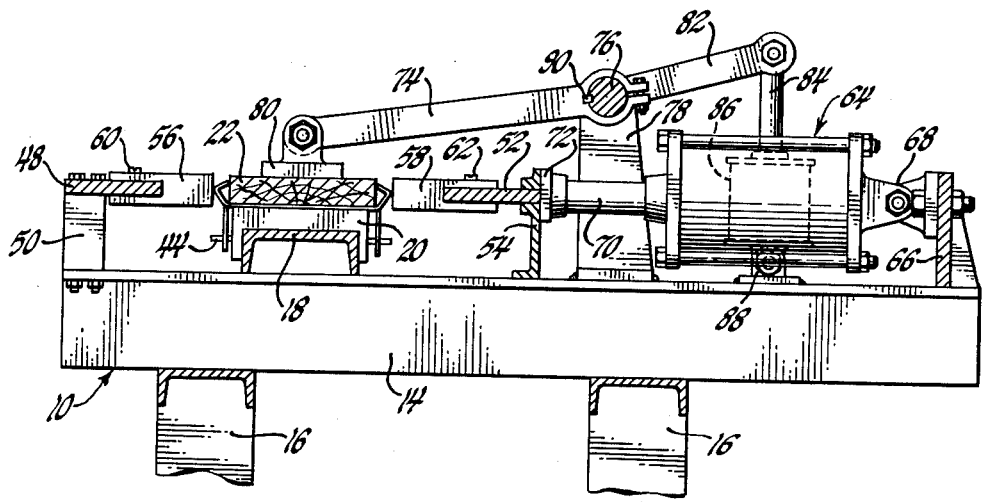

May 26, 1964
H. R. PIANKO ETAL
3,134,105
CLIP ATTACHING MECHANISM
Filed July 10, 1962
4 Sheets-Sheet 1
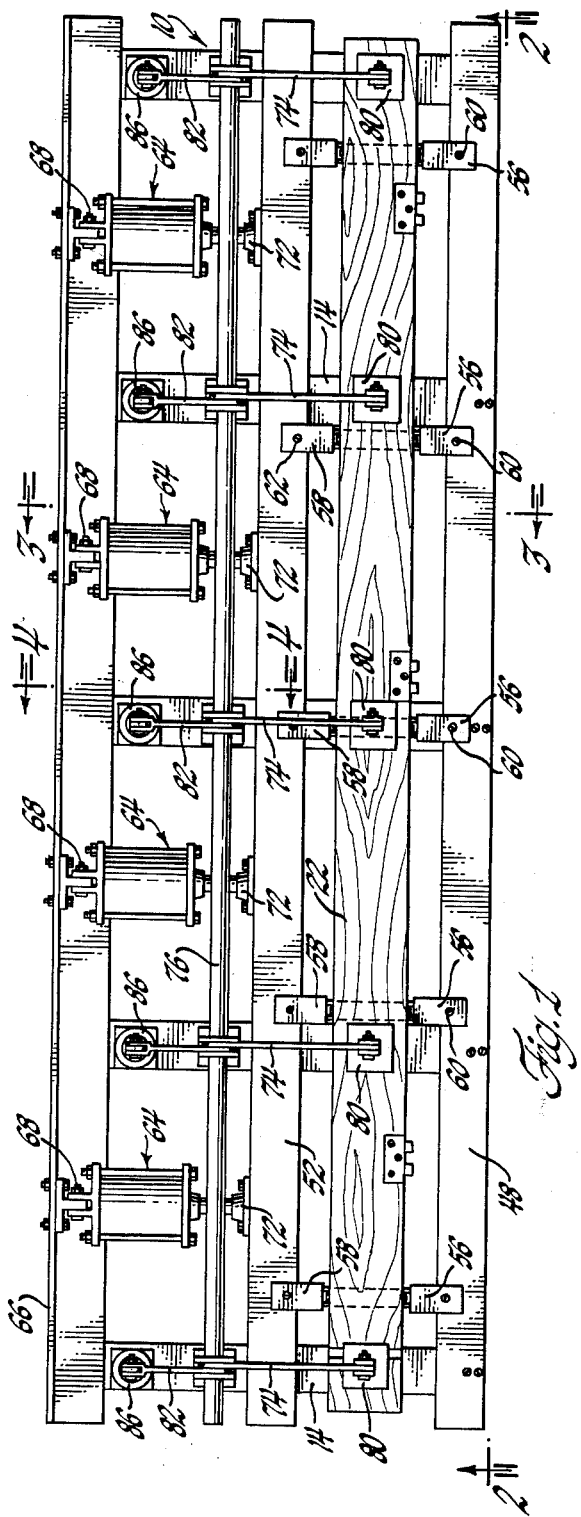
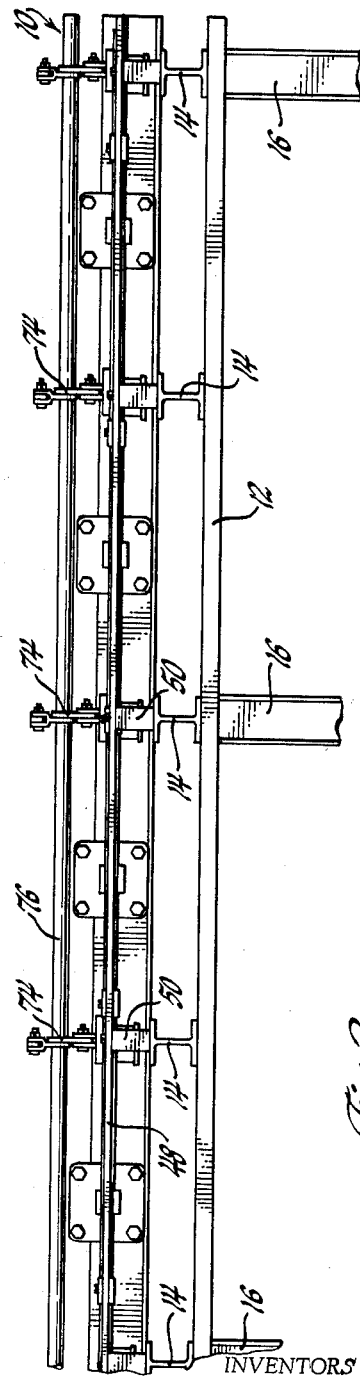
INVENTORS
Harvey R. Pianko &
BY Leonard A. Grushko
Barnard & McGlynn
ATTORNEYS May 26, 1964

H. R. PIANKO ETAL 3,134,105

CLIP ATTACHING MECHANISM

Filed July 10, 1962

4 Sheets-Sheet 3

INVENTORS
Harvey R. Pianko &
BY Leonard A. Grushko
Barnard & McGlynn
ATTORNEYS 3,134,105
CLIP ATTACHING MECHANISM
Harvey R. Pianko and Leonard A. Grushko, Oak Park, Mich., assignors, by mesne assignments, to Truswal Systems, Inc., Detroit, Mich., a corporation of Michigan
Filed July 10, 1962, Ser. No. 208,823
8 Claims. (Cl. 1—210)

The present invention relates to a mechanism for attaching a plurality of clip elements to a structural member. More specifically, the present invention relates to a mechanism which permits a plurality of metal clip elements to be simultaneously secured to an elongated structural member such as a board whereby the board may be delivered to a construction site prepared for joining with another structural member.

In order to economize, particularly labor costs, in the construction of houses and other structures, it is becoming increasingly common for structural components to be prefabricated in mills and delivered to the construction site for further assembly. The obvious advantages of this type of construction are that mill machines are able to be used which are not otherwise available on a construction site, mass production techniques may be employed and further more efficient use of materials is possible.

As set forth in copending application Serial No. 132,798 Pianko, filed August 21, 1961, a unique clip element has been developed which greatly facilitates the construction and assembly of certain subassemblies such as door frames. The appropriate door frame members are made available on the building site with such clips attached whereby the door frame may be assembled to the supporting stud members with a greatly reduced labor effort than previously required.

Each clip is generally H shaped in which a first set of upwardly and outwardly inclined pointed legs extend from the cross or base portion of the clip while a second set of legs extend in generally the opposite direction from said base.

The present invention relates to a machine which permits the simultaneous application of a plurality of such clip members to a door frame member in a way that the frame may be delivered to a site in condition for ready mounting to the appropriate door frame supporting stud members.

While the subject mechanism is of utility in any situation in which it is desired to mount a clip member to a relatively softer structural member by clinching the former thereto, the invention will be illustrated to show the application of metal clip members to a door jamb member.

It is generally an object of the present invention to provide a machine which is adapted to simultaneously secure a plurality of metal clip elements along the longitudinal length of a board member.

The present machine includes a base structure adapted to horizontally support a board member upon a plurality of clip mounting pads adjustable longitudinally relative to the base. The clip mounting pads are transversely mounted between a pair of longitudinally extending rail members also supported on the base. Each clip mounting pad is adapted to removably support a clip member in an upstanding position so that the board member may be laid therein with the longitudinal edges of the boards being proximately disposed to the pointed legs. One of the rail members is fixed to the base while the other rail is movable transversely relative to the fixed rail. Prior to the movement of the movable rail toward the fixed rail to clinch the clip elements to the board member, additional means is provided for pressing the board member downwardly toward the clip supporting pads whereby the board and clips are maintained in intimate relationship.

The details as well as other objects and advantages of the present invention will be apparent from a perusal of the detailed description which follows taken in conjunction with the attached drawings.

Figure 4:
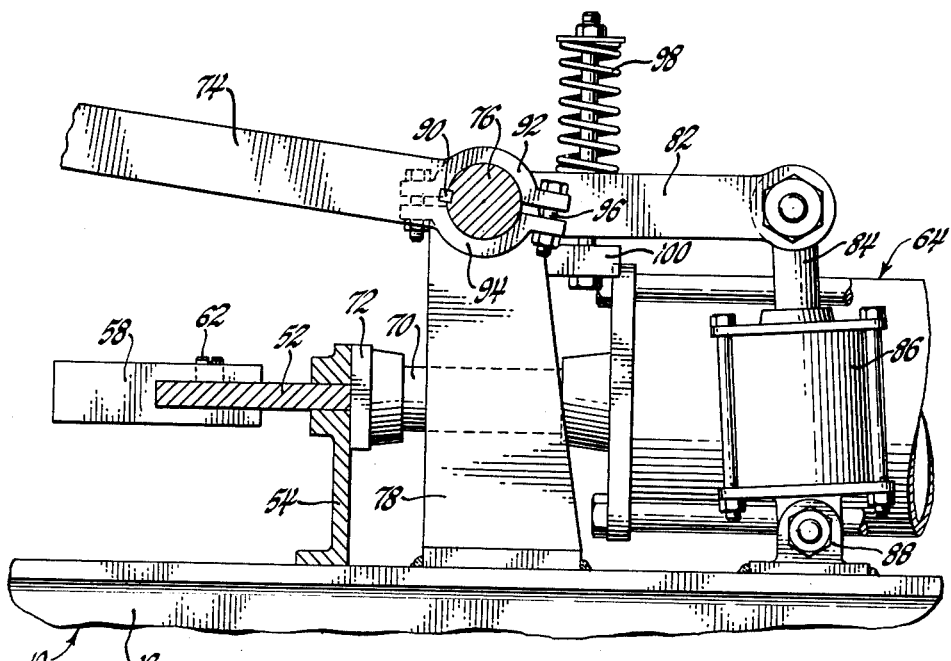
Figure 5:
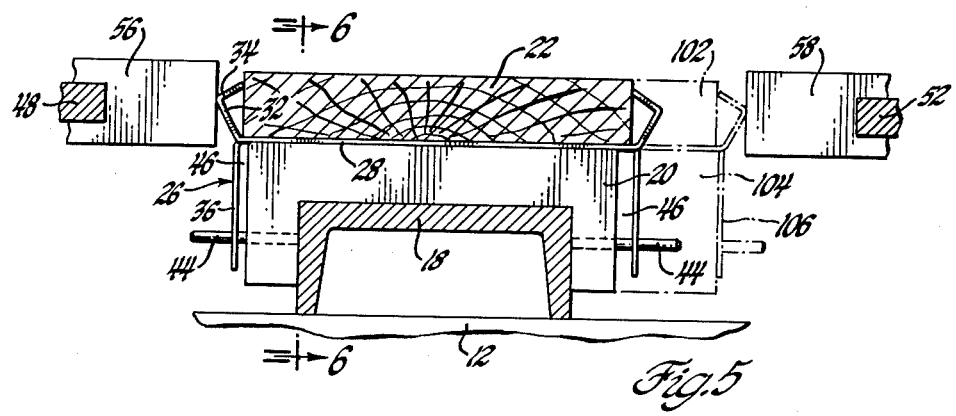
Figure 6:
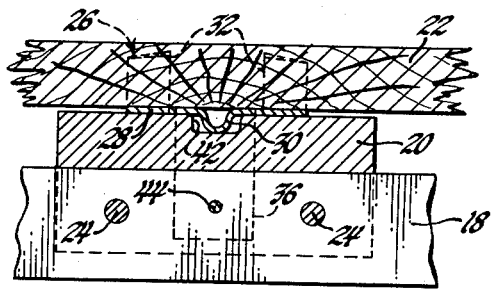
Figure 7:
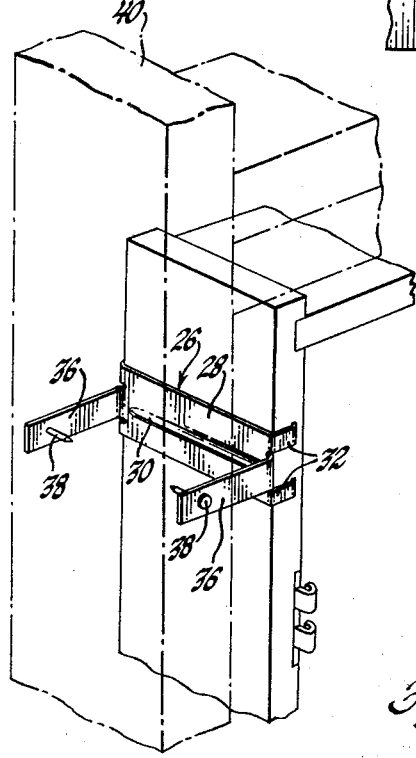

In the drawings:
FIGURE 1 is a plan view of the subject mechanism;
FIGURE 2 is an elevational view taken along line 2—2 of FIGURE 1;
FIGURE 3 is a cross sectional view taken along line 3—3 of FIGURE 1;
FIGURE 4 is an elevational view along line 4—4 of FIGURE 1;
FIGURE 5 is an enlarged detail view showing the clip supporting pad;
FIGURE 6 is a view along line 6—6 of FIGURE 5;
FIGURE 7 is a fragmentary view of a door jamb having a clip element mounted thereon; and
FIGURES 8 and 9 disclose another modification of the subject invention.

Referring to FIGURES 1, 2 and 3, a clip clinching mechanism is indicated generally at 10 and includes a base or supporting structure including horizontal and transverse beam members 12 and 14 supported on vertical legs or beams 16.

A longitudinally extending C shaped rail member 18 is supported upon transverse beams 14 and is adapted to support a plurality of longitudinally spaced clip supporting pads 20 as best seen in FIGURES 5 and 6. In order to permit the proper spacing of clip pads 20 at the proper predetermined intervals along a board member 22, the pads are longitudinally adjustable along rail 18.

As best seen in FIGURE 6, the suitable locking screws 24, or the like, are adapted to lock each pad in its predetermined position.

Before referring further to the subject mechanism, a brief description of clip 26 will be undertaken. As previously noted, clip 26 is the subject of the aforenoted copending application. The construction of clip 26 may best be appreciated by referring to FIGURES 5–7. Clip 26 includes a base or strip portion 28 having a transversely extending rib 30 and each side of which terminates in a pair of upstanding leg portions 32 having terminal pointed portions 34 which are adapted to be driven into the associated board member. Generally oppositely extending legs 36 are disposed between the upstanding legs 32. Downwardly extending legs 36 include holes therein eventually adapted to receive nail members 38 whereby the clip and associated jamb member are mounted on a supporting stud 40, shown in FIGURE 7.

Referring more specifically to FIGURES 5 and 6, it will be seen that each clip supporting pad 20 has a transverse groove 42 formed therein adapted to receive clip rib 30 in order that the base portion 28 of the clip will sit flat on the pad. Pin members 44 are associated with each clip pad member and are adapted to extend through nail holes in legs 36 to retain the clip member on the pad during the clinching operation. Pins 44 are either removably or retractably mounted with respect to pads 20 to permit the clips to be mounted and removed from the pads. Upstanding pairs of legs 32 are upwardly and outwardly inclined to permit the board member 22 to be placed therebetween prior to clinching engagement.

As may best be seen in FIGURE 5, base portion 28 of clip 26 is wider than the clip pad in order to leave space 46 between clip and pad. The purpose of this width differential or spacing is to permit relative transverse movement of board 22 and clip member 26 with respect to the pad members to facilitate the clinching operation, infra.

A fixed rail 48 is mounted through vertical spacer members 50 upon transverse beam members 14. A movable rail 52 is adjustably mounted on transverse beams 14 again through vertical spacers 54. Pad supporting rail 18 is disposed between fixed and movable rails 48 and 52 and all of which rails are parallel to each other.

Referring particularly to FIGURES 3 and 4, it is to be noted that fixed rail 48 includes a plurality of clip engaging stops 56 suitably mounted thereon. Clip engaging stops 54 are suitably secured to fixed rail 48 so as to permit longitudinal adjustment thereof in order that the stops be aligned with the clip supporting pads 20. Stops 56 must be transversely aligned with pads 20 in order to engage upwardly and outwardly inclined clip legs 32.

Corresponding clip engaging stop members 58 are mounted on movable rail 52. Stops 58 are also longitudinally adjustable relative to the supporting movable rail 52 to permit the aforenoted alignment with clip supporting pads 20. Clip engaging stops 56 and 58 are respectively releasably secured to their associated supporting rails through screws 60 and 62.

A plurality of servo motors 64 are adapted to actuate movable rail 52 transversely relative to fixed rail 48. While servo motors 64 may be powered in any suitable manner, e.g. electrically, hydraulically, etc., in the preferred form of the invention the motors are pneumatically driven.

The switch or valve means for controlling servo motors 64 are not shown since they do not, per se, constitute a part of the subject invention and may, therefore, be of any well known design.

Motors 64 are articulated to a rail 66 through a suitable pivotal connection 68. In the normal fashion, motor 64 includes a piston, not shown, and a piston rod 70 secured at its outer end through a coupling 72 to movable rail 52. Thus, when compressed air is admitted to one side of the servo motor piston or the other, movable rail 52 is moved either toward or away from fixed rail 48.

In order to insure that board 22 is maintained firmly against clips 26, means is provided for exerting a vertically downward pressure on the board. To this end, a plurality of arms 74 are fixed to a rod 76 rotatably supported in brackets 78, in turn, secured to beams 14. Arms 74 terminate in board engaging pads 80 loosely articulated thereto.

Also fixed to rotatable rod 76 are arms 82 the other end of which are articulated to piston rods 84 of vertically oriented servo motors 86. Servo motors 86 are interspaced between the movable rail actuating servo motors 64 and are articulated through connections 88 to transverse beams 14. Both arms 74 and 82 are keyed to rod 76 through key members 90 to prevent relative movement between the rod and arms.

Thus, when servo motors 86 are energized to move the piston rods 84 upwardly, rod 76 is rotated in a counterclockwise direction, as viewed in FIGURES 3 and 4, imparting a similar rotation to arms 74 and 82 thereby causing pads 80 to engage boards 22 and force the same into intimate engagement with clips 26.

Consistent with the longitudinal adjustability of clip supporting pads 20 and clip engaging stops 56 and 58, arms 74 are likewise made longitudinally adjustable relative to rotatable rod 76. This adjustability is achieved in the illustrative embodiment of FIGURE 4 through the arm clamping arrangement which includes the bifurcated end portions 92 and 94 urged toward each other through suitable nut and bolt member 96.

It will be appreciated that through the respective longitudinally adjusting means, clip stop members 56 and 58, clip supporting pad 20 and board engaging pad 80 may all be suitably aligned to provide the proper clinching pressures as will subsequently be described.

Referring to FIGURE 4, if desired, a suitable compensating or counterbalance spring 98 is mounted on support 100 extending from bracket 78 so that one end of the spring engages arm 82 to urge the same in a clockwise direction which will tend to rotate rod 76 to thereby retract board engaging pads 80 when servo motors 86 are de-energized. While only one such spring 98 has been shown, as many may be provided as is necessary to provide the requisite rotating force to rod 76.

The operation of the subject mechanism may be summarized as follows: clips 26 are mounted upon pads 20 and retained thereon by pins 44; next board 22 is placed between pointed arms 32; servo motors 86 are then energized to move pads 80 into engagement with board 22; thereafter servo motors 64 are energized moving rail 52 toward fixed rail 48; rail movement causes clip stops 58 to engage the proximate legs 32 and move the board and clips until the other legs 32 engage fixed rail stops 56; continued servo pressure will force the pointed ends of legs 32 to bite into the side edges of the board until they are flush therewith; finally the servo pressures are released to unclamp the board which is then removed from the machine after pins 44 are disconnected from clip legs 36.

Referring to FIGURE 5, it will be appreciated that it is possible to use the subject machine with various width boards. As shown in dash lines a run of wider boards 102 may be accommodated simply substituting wider clip pads 104 which would, in turn, support wider clips 106.

Figure 8:
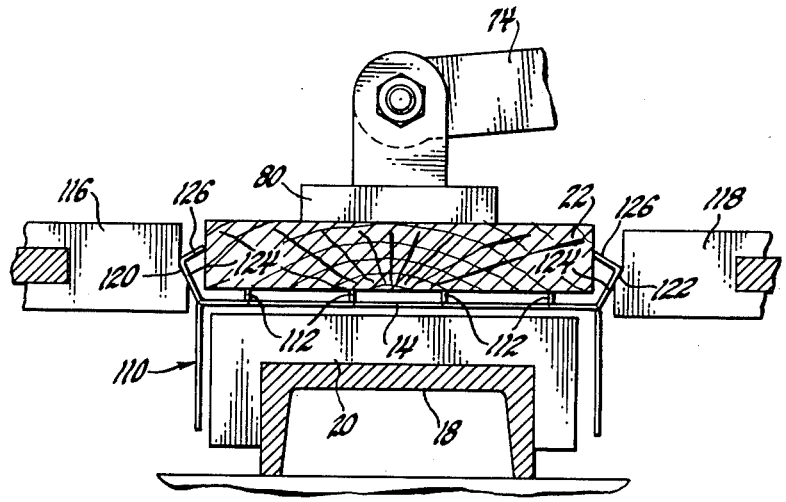
Figure 9:
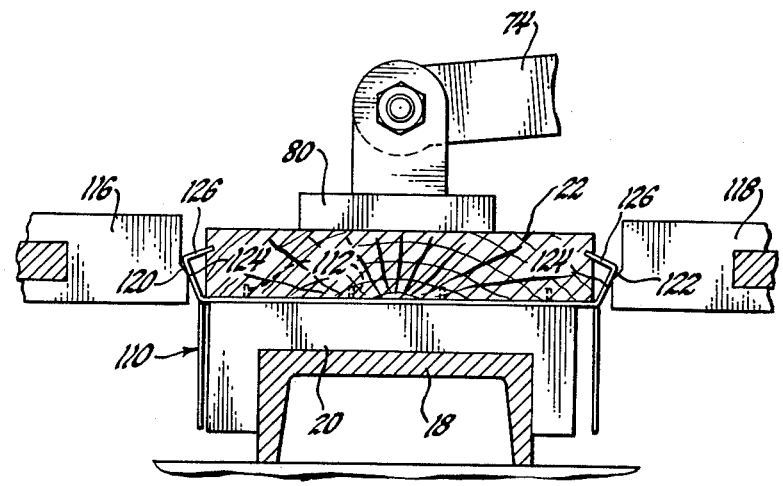

A modification of the subject apparatus is shown in FIGURES 8 and 9. In some cases it has developed that the angle of the clip prongs 34 is such in relation to the sides of the jamb boards that when the movable clip stops 58 are moved toward the fixed clip stops 56 some of the prongs will be flattened out rather than driven into the side of the board. The modification of FIGURES 8 and 9 avoids this flattening of the clip prongs by providing means whereby the prongs make a partial entry into the board prior to the transverse driving action of the movable clip stops 58.

Referring to the clip 110 shown in FIGURES 8 and 9, it will be noted that prongs 112 are struck from the base portion 114 of the clip and provide a means for holding the clip in position during the driving of the side prongs into the board.

Referring first to FIGURE 8, it will be noted that both the fixed clip stop 116 and the driving or movable clip stop 118 are transversely recessed or relieved to provide shoulders 120 and 122. Each of the clips 110 is then placed between the stops 116 and 118 and supported on shoulders 120 and 122 through clip legs 124 so that the clip base portion 114 is vertically spaced above pad member 20. Jamb board 22 is then laid over a plurality of clips and supported upon base portion prongs 112.

At this time, pressure pads 80 are moved into engagement with board 22 by actuation of servos 86. The continued application of pressure by pads 80 forces board 22 and clip 110 downwardly toward pad 20. As clip 110 moves downwardly, clip legs 124 cam on shoulders 120 and 122 respectively and are rolled transversely inwardly toward the side edges of board 22 causing clip prongs 126 to be partially driven therewithin. At the same time, when clip base portion 114 seats on pad 20 prongs 112 are driven into the board to fix the clip position prior to completing of the driving of prongs 126 into the board.

It is to be noted that by initially rolling the clip legs 126 about the line where they connect with the base portion 114, prongs 126 will assume an attitude, more nearly perpendicular to the board edges, whereby they will be driven into the side of the board rather than being flattened as may occur when the prongs are attempted to be driven into the board with solely a transverse driving action.

With the parts in the position shown in FIGURE 9, clip prongs are partially embedded in the sides of board 22. The movable clip servos 86 are now actuated to complete the prong driving sequence.

While illustrative embodiments of the subject mechanism have been shown, it is to be understood that further structural modifications may be made within the intended scope of the invention as set forth in the hereinafter appended claims.

We claim:

1. A mechanism for clinching a plurality of pronged clip members to a board member, said mechanism comprising a longitudinally extending base member, a plurality of sets of clip engaging stops longitudinally spaced along said base, each of said sets including a fixed and a movable stop member aligned generally transversely of the base member, means for supporting each clip member in an upstanding position so as to receive the board member, means for exerting a downwardly acting pressure on said board member to maintain the same in engagement with said clip members, and means for actuating said movable clip stops toward said fixed stops whereby said pronged clip member will clinchingly engage said board.

2. A mechanism for clinching a plurality of pronged clip members to a board member, said mechanism comprising a longitudinally extending base member, means for supporting said clip members in an upstanding and longitudinally spaced relationship whereby said board is supported upon said clips, first means for holding said board and clip members in tight engagement and second means for driving the pronged portions of the clip members into clinching engagement with said board.

3. A mechanism as set forth in claim 2 in which said first means exerts a force in one direction to hold said board and clip members in tight engagement, said second means exerting a clinching force on said clip members in a direction substantially normal to the direction of the force of the first means.

4. A mechanism as set forth in claim 2 in which said first means coacts with the clip supporting means to cause a partial clinching of the clip members to said board member and in which the second means completes the clinching.

5. A mechanism as set forth in claim 3 in which the clip supporting means includes shoulders upon which the pronged portions of the clip members are supported, said first means being adapted to move said board member and clip members relative to said shoulders whereby the pronged clip portions are partially driven within the board member.

6. A mechanism as set forth in claim 1 in which the clip supporting means includes a shoulder formed on each clip engaging stop, the shoulders of each set being adapted to support a clip member through the pronged portion thereof.

7. A mechanism as set forth in claim 6 in which said downwardly acting pressure means causes an initial clinching of the clip members to the board.

8. A mechanism for clinching generally H-shaped clip members to a board member, said mechanism comprising a base, a plurality of longitudinally extending rail members supported upon said base, said rails being parallel and transversely spaced from each other, one of said rails being fixed relative to said base, another of said rails being movable transversely relative to said base, means disposed intermediate said rails for supporting each clip member in a vertical position so as to receive said board member, means for exerting a vertically downwardly acting pressure on said board member to maintain the same in engagement with said clip supporting means, means for removably retaining each clip on said supporting means, and means for actuating the movable rail toward the fixed rail causing the rails to engage and clinch said clip members to the board; and a first set of clip engaging stop elements secured to and longitudinally spaced along said fixed rail member, and a second set of clip engaging stop elements mounted on said movable rail and transversely aligned with said first set of stop elements.

References Cited in the file of this patent
UNITED STATES PATENTS
529,697     Bond _____ Nov. 27, 1894